(12) United States Patent
Kawabata

(10) Patent No.: US 8,293,425 B2
(45) Date of Patent: Oct. 23, 2012

(54) FUEL CELL AND GASKET

(75) Inventor: Tatsuo Kawabata, Susono (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 933 days.

(21) Appl. No.: 12/097,077

(22) PCT Filed: Dec. 11, 2006

(86) PCT No.: PCT/JP2006/325118
§ 371 (c)(1),
(2), (4) Date: Jun. 12, 2008

(87) PCT Pub. No.: WO2007/069747
PCT Pub. Date: Jun. 21, 2007

(65) Prior Publication Data
US 2010/0003565 A1    Jan. 7, 2010

(30) Foreign Application Priority Data

Dec. 15, 2005   (JP) ................................ 2005-361199

(51) Int. Cl.
*H01M 8/10* (2006.01)
(52) U.S. Cl. ....................................... 429/479; 429/400
(58) Field of Classification Search .................. 429/479
See application file for complete search history.

(56) References Cited

U.S. PATENT DOCUMENTS

| | | | |
|---|---|---|---|
| 6,231,053 B1 | 5/2001 | Wakamatsu | |
| 2002/0015873 A1 | 2/2002 | Bruckner et al. | |
| 2005/0095490 A1* | 5/2005 | Mittelstadt et al. | 429/35 |
| 2009/0291340 A1* | 11/2009 | Bourgeois et al. | 429/19 |

FOREIGN PATENT DOCUMENTS

| | | |
|---|---|---|
| DE | 199 03 352 | 8/2000 |
| EP | 0 918 362 A2 | 5/1999 |
| JP | 9-167623 | 6/1997 |
| JP | 2001-57220 | 2/2001 |
| JP | 2003-68318 | 3/2003 |
| JP | 2004-165125 | 6/2004 |
| JP | 2005-116404 | 4/2005 |
| JP | 2005-190706 | 7/2005 |
| WO | WO 2005/008826 A1 | 1/2005 |

\* cited by examiner

*Primary Examiner* — Patrick Ryan
*Assistant Examiner* — Brent Thomas
(74) *Attorney, Agent, or Firm* — Finnegan, Henderson, Farabow, Garrett & Dunner, LLP

(57) ABSTRACT

The polymer electrolyte fuel cell of the invention includes: an electrolyte membrane that is made of a solid polymer; catalyst electrode layers that are arranged and formed on two opposed faces of the electrolyte membrane; gas separators that form reactive gas supply flow paths to allow passage of reactive gases subjected to an electrochemical reaction to the catalyst electrode layers; a holder element that is located on periphery of the electrolyte membrane and the catalyst electrode layers to support at least the electrolyte membrane; an expansion element that is linked with the holder element to be expandable in an electrolyte membrane surface direction; and a fixation element that is linked with the expansion element to be fixed to the gas separators. This arrangement effectively prevents deterioration of the electrolyte membrane, due to expansion or contraction of the electrolyte membrane in the polymer electrolyte fuel cell.

14 Claims, 8 Drawing Sheets

FUEL CELL AND GASKET

TECHNICAL FIELD

The present invention relates to the structure of a fuel cell including a solid polymer electrolyte membrane.

BACKGROUND ART

A polymer electrolyte fuel cell has an electrolyte membrane that is made of a solid polymer having proton conductivity. Diverse techniques have been proposed with regard to the polymer electrolyte fuel cell. In the polymer electrolyte fuel cell, during each cycle of power generation, a hydrogen-containing fuel gas and an oxygen-containing oxidizing gas are supplied as reactive gases of an electrochemical reaction to a fuel electrode or anode and to an oxygen electrode or cathode, which are formed as catalyst electrode layers on two opposed faces of the electrolyte membrane. Water is produced on the cathode as the product of the electrochemical reaction. The electrolyte membrane is thus kept in the wet state by the produced water during the cycle of power generation. In the polymer electrolyte fuel cell, during an intermittent rest time period, however, no water is produced on the cathode by the electrochemical reaction, so that the electrolyte membrane is dried. One proposed structure of the polymer electrolyte fuel cell is disclosed in Japanese Patent Laid-Open Gazette No. 2003-68318.

In the conventional polymer electrolyte fuel cell, repeated cycles of power generation with intermittent rest time periods frequently change the humidity state of the electrolyte membrane between the wet state and the dried state. The frequent change in humidity state causes frequent expansion and contraction of the electrolyte membrane. The frequent expansion and contraction applies a significant stress (strain) onto the electrolyte membrane and leads to untimely deterioration of the electrolyte membrane.

DISCLOSURE OF THE INVENTION

The object of the invention is to eliminate the drawbacks of the prior art technique and to provide a technique applicable to a polymer electrolyte fuel cell to prevent deterioration of an electrolyte membrane due to expansion or contraction of the electrolyte membrane.

In order to attain at least part of the above and the other related objects, the present invention is directed to a first polymer electrolyte fuel cell, which includes: an electrolyte membrane that is made of a solid polymer; catalyst electrode layers that are arranged and formed on two opposed faces of the electrolyte membrane; gas separators that form reactive gas supply flow paths to allow passage of reactive gases subjected to an electrochemical reaction to the catalyst electrode layers; a holder element that is located on periphery of the electrolyte membrane and the catalyst electrode layers to support at least the electrolyte membrane; an expansion element that is linked with the holder element to be expandable in an electrolyte membrane surface direction; and a fixation element that is linked with the expansion element to be fixed to the gas separators.

The electrolyte membrane may be expanded or contracted in the electrolyte membrane surface direction in the polymer electrolyte fuel cell through repeated cycles of power generation with intermittent rest time periods. In the first polymer electrolyte fuel cell of the invention, the expansion element is expanded or contracted with the expansion or contraction of the electrolyte membrane and thus relieves the stress applied to the electrolyte membrane. This structure of the invention effectively prevents deterioration of the electrolyte membrane due to the expansion or contraction of the electrolyte membrane in the electrolyte membrane surface direction.

At least part of the above and the other related objects is also attainable by a second polymer electrolyte fuel cell of the invention, which includes: an electrolyte membrane that is made of a solid polymer; catalyst electrode layers that are arranged and formed on two opposed faces of the electrolyte membrane; a holder element that is located on periphery of the electrolyte membrane to support at least the electrolyte membrane; and a fixation element that fixes the holder element.

The electrolyte membrane has a non-lamination area with no lamination of the catalyst electrode layers on the periphery of the electrolyte membrane. The electrolyte membrane has an expansion element that is provided in at least part of the non-lamination area and is expandable in an electrolyte membrane surface direction.

The electrolyte membrane may be expanded or contracted in the electrolyte membrane surface direction in the polymer electrolyte fuel cell through repeated cycles of power generation with intermittent rest time periods. In the second polymer electrolyte fuel cell of the invention, the expansion element formed in the non-lamination area of the electrolyte membrane is expanded or contracted with the expansion or contraction of the electrolyte membrane and thus relieves the stress applied to the electrolyte membrane. This structure of the invention effectively prevents deterioration of the electrolyte membrane due to the expansion or contraction of the electrolyte membrane in the electrolyte membrane surface direction.

In the first polymer electrolyte fuel cell of the invention, it is preferable that the expansion element has a higher elastic modulus in the electrolyte membrane surface direction than an elastic modulus of the holder element or an elastic modulus of the fixation element.

This arrangement effectively enables the expansion element to be expanded or contracted with the expansion or contraction of the electrolyte membrane and thus relieves the stress applied to the electrolyte membrane.

In one preferable structure of the first polymer electrolyte fuel cell or the second polymer electrolyte fuel cell of the invention, either of the holder element and the fixation element forms at least part of a gasket, which is activated to ensure gas sealing property between the two opposed faces of the electrolyte membrane.

This structure desirably decreases the total number of parts constituting the polymer electrolyte fuel cell.

In one preferable embodiment of the invention, the first polymer electrolyte fuel cell or the second polymer electrolyte fuel cell further includes gas diffusion layers that are placed outside the respective catalyst electrode layers and are made of an electrically-conductive porous material.

This arrangement enables the reactive gases used for the electrochemical reaction to be efficiently supplied to the respective catalyst electrode layers.

In the first polymer electrolyte fuel cell or the second polymer electrolyte fuel cell, the expansion element may have a serpentine structure.

The serpentine structure of the expansion element is expanded or contracted with the expansion or contraction of the electrolyte membrane and thus relieves the stress applied to the electrolyte membrane.

In order to attain at least part of the above and the other related objects, the present invention is also directed to a gasket that is applied to a polymer electrolyte fuel cell. The polymer electrolyte fuel cell has: an electrolyte membrane that is made of a solid polymer; catalyst electrode layers that are arranged and formed on two opposed faces of the electrolyte membrane; and gas separators. The gasket is activated to ensure gas sealing property between the two opposed faces of the electrolyte membrane.

The gasket includes: a holder element that is located on periphery of the electrolyte membrane and the catalyst electrode layers to support at least the electrolyte membrane; an expansion element that is linked with the holder element to be expandable in an electrolyte membrane surface direction; and a fixation element that is linked with the expansion element to be fixed to the gas separators.

The electrolyte membrane may be expanded or contracted in the electrolyte membrane surface direction in the polymer electrolyte fuel cell through repeated cycles of power generation with intermittent rest time periods. The gasket of the invention enables the expansion element to be expanded or contracted with the expansion or contraction of the electrolyte membrane and thus relieves the stress applied to the electrolyte membrane. This structure of the invention effectively prevents deterioration of the electrolyte membrane due to the expansion or contraction of the electrolyte membrane in the electrolyte membrane surface direction.

The technique of the invention is not restricted to the polymer electrolyte fuel cell or the gasket described above but may be attained by diversity of applications, for example, a fuel cell system including first polymer electrolyte fuel cells or second polymer electrolyte fuel cells of the invention.

BEST MODES FOR CARRYING OUT THE INVENTION

Figure 1:
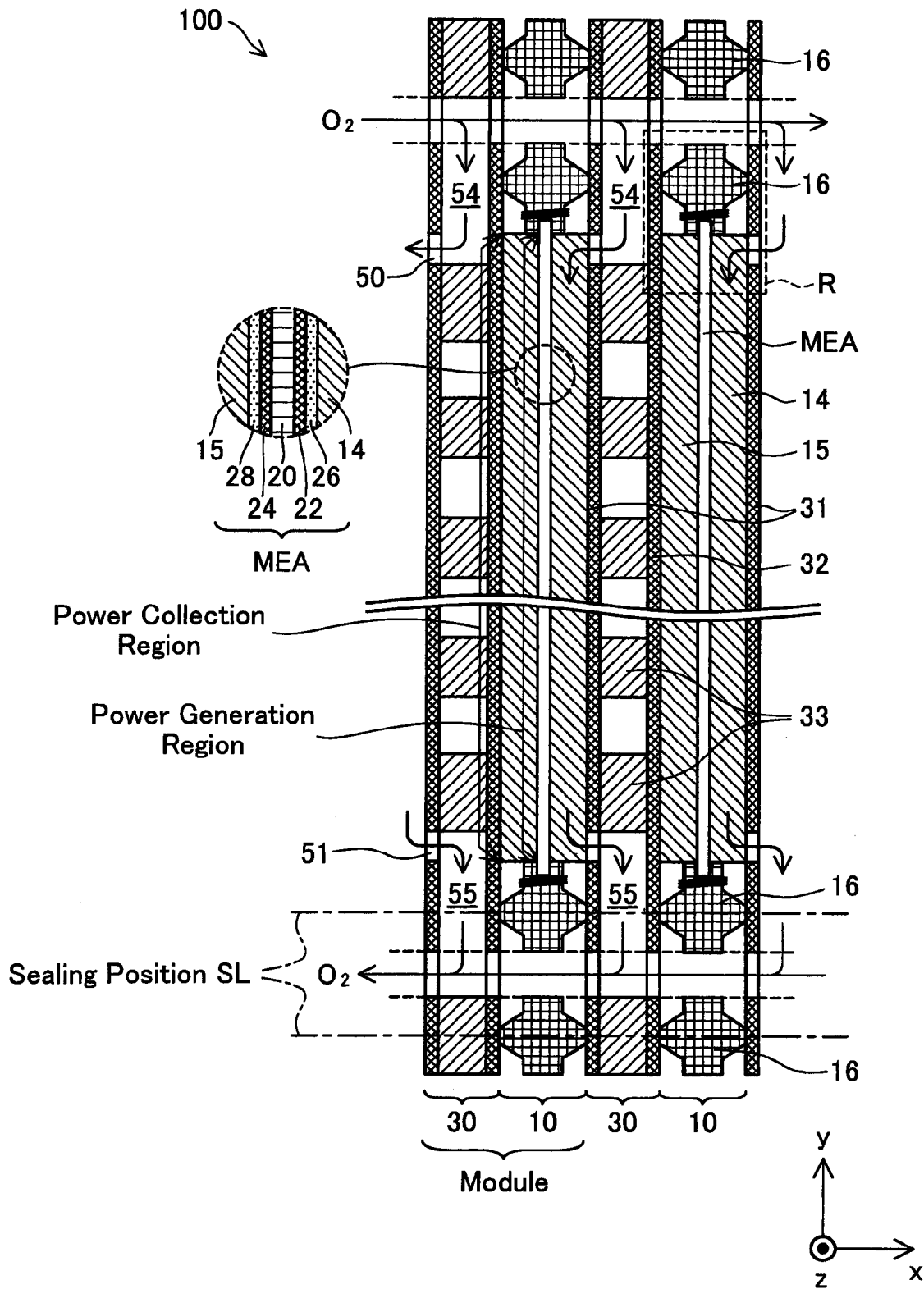
FIG. 1 is a sectional view schematically illustrating the structure of a fuel cell stack including MEAs (membrane electrode assemblies) in a first embodiment of the invention.

Some modes of carrying out the invention are described below in the following sequence as preferred embodiments with reference to the accompanied drawings:

A. First Embodiment
A1. Structure of Fuel Cell Stack
A2. Structure of Gasket
B. Second Embodiment
C. Modifications A. First Embodiment A1. Structure of Fuel Cell Stack FIG. 1 is a sectional view schematically illustrating the structure of a fuel cell stack 100 in a first embodiment of the invention. In the description below, directions 'x', 'y', and 'z' are defined as illustrated in FIG. 1. The fuel cell stack 100 of the first embodiment is constructed as a stack of polymer electrolyte fuel cells. As shown in FIG. 1, the fuel cell stack 100 has multiple unit cells 10 laid one upon another in the direction 'x' via separators 30. The separator 30 used in the polymer electrolyte fuel cells 100 of the embodiment is a three-layered separator including three different plates. An assembly of one unit cell 10 and a pair of separators 30 arranged across the unit cell 10 may be hereafter referred to as one module.

The unit cell 10 has a membrane electrode assembly (MEA) and a pair of second gas diffusion layers 14 and 15 placed on the respective outside faces of the MEA. The MEA includes an electrolyte membrane 20, a cathode 22 and an anode 24 arranged across the electrolyte membrane 20 and formed as catalyst electrodes on the opposed faces of the electrolyte membrane 20, and a pair of first gas diffusion layers 26 and 28 located outside the respective catalyst electrodes 22 and 24.

The electrolyte membrane 20 is a proton-conductive ion exchange membrane made of a solid polymer material, for example, perfluorocarbon sulfonic acid-based fluororesin, and has the good electric conductivity in the wet state. The cathode 22 and the anode 24 have a catalyst metal for accelerating the electrochemical reaction, for example, platinum or platinum-based alloy. One typical method of preparing the cathode 22 and the anode 24 provides carbon powder with the catalyst metal, such as platinum, supported thereon, prepares a catalyst paste by mixing the catalyst-supported carbon powder with an electrolyte material, which is identical with the electrolyte material of the electrolyte membrane 20, and applies the catalyst paste on the opposed faces of the electrolyte membrane 20. The first gas diffusion layers 26 and 28 are made of a porous carbon material, for example, carbon cloth or carbon paper. The electrolyte membrane 20 with the catalyst electrodes 22 and 24 formed on its opposed faces is integrated with the first gas diffusion layers 26 and 28, for example, by pressing to give the MEA. The electrolyte membrane 20 has the good electric conductivity in the wet state as mentioned above. The fuel cell stack 100 of the embodiment accordingly has a high efficiency of power generation in the wet state of the electrolyte membranes 20.

The second gas diffusion layers 14 and 15 are made of a porous metal material, such as foamed metal or meshed metal. In the structure of the embodiment, a porous titanium material is used for the second gas diffusion layers 14 and 15. The second gas diffusion layers 14 and 15 are provided to occupy the whole space formed between the MEA and the separators 30. The inner space formed by a large number of pores in each of the second gas diffusion layers 14 and 15 functions as a unit cell gas flow path to allow passage of a reactive gas for the electrochemical reaction. Although the inner spaces of the first gas diffusion layers 26 and 28 also allow passage of gases, the second gas diffusion layers 14 and 15 form the main space for passage of the reactive gases supplied to each unit cell 10. The inner space formed by the large number of pores in the second gas diffusion layer 14 placed between the cathode 22 and the separator 30 functions as a unit cell oxidizing gas flow path to allow passage of an oxygen-containing oxidizing gas (cathode gas). The inner space formed by the large number of pores in the second gas diffusion layer 15 placed between the anode 24 and the separator 30 functions as a unit cell fuel gas flow path to allow passage of a hydrogen-rich fuel gas (anode gas).

The MEA has a power generation region that receives the supplies of the reactive gases (fuel gas and oxidizing gas) and generates electric power, as illustrated in FIG. 1.

The separator 30 includes a cathode-side plate 31 adjacent to the second gas diffusion layer 14, an anode-side plate 32 adjacent to the second gas diffusion layer 15, and a middle plate 33 interposed between the cathode-side plate 31 and the anode-side plate 32, as shown in FIG. 1. These three plates are thin sheets of an electrically conductive material, for example, stainless steel, titanium, or titanium-based alloy. The cathode-side plate 31, the middle plate 33, and the anode-side plate 32 are laid one upon another in this order and are joined by, for example, diffusion joint. The three plates have flat faces without undulation and required holes of preset shapes formed at predetermined positions.

Figure 2:
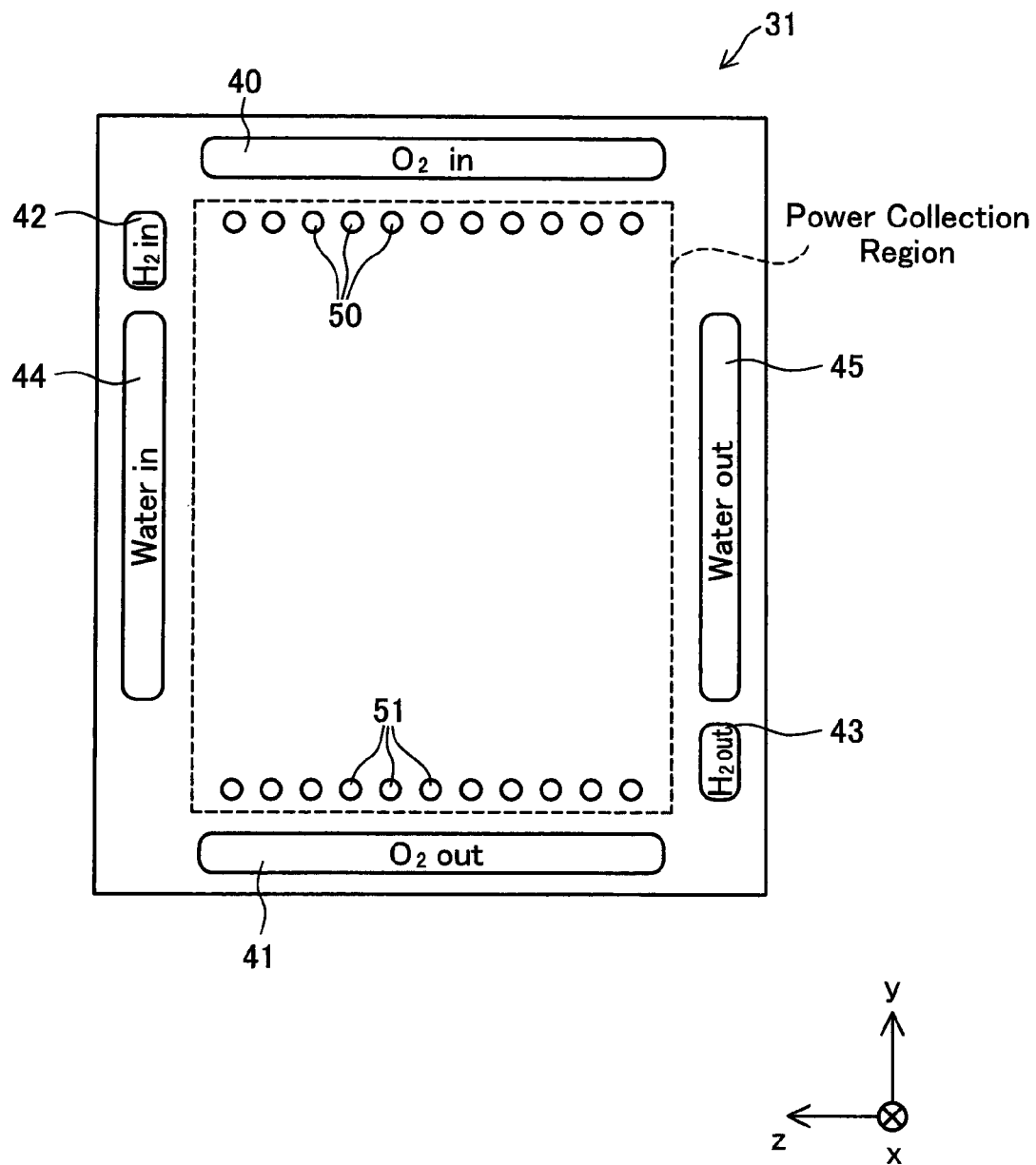
FIG. 2 is a plan view showing the structure of a cathode-side plate of the fuel cell stack.
Figure 3:
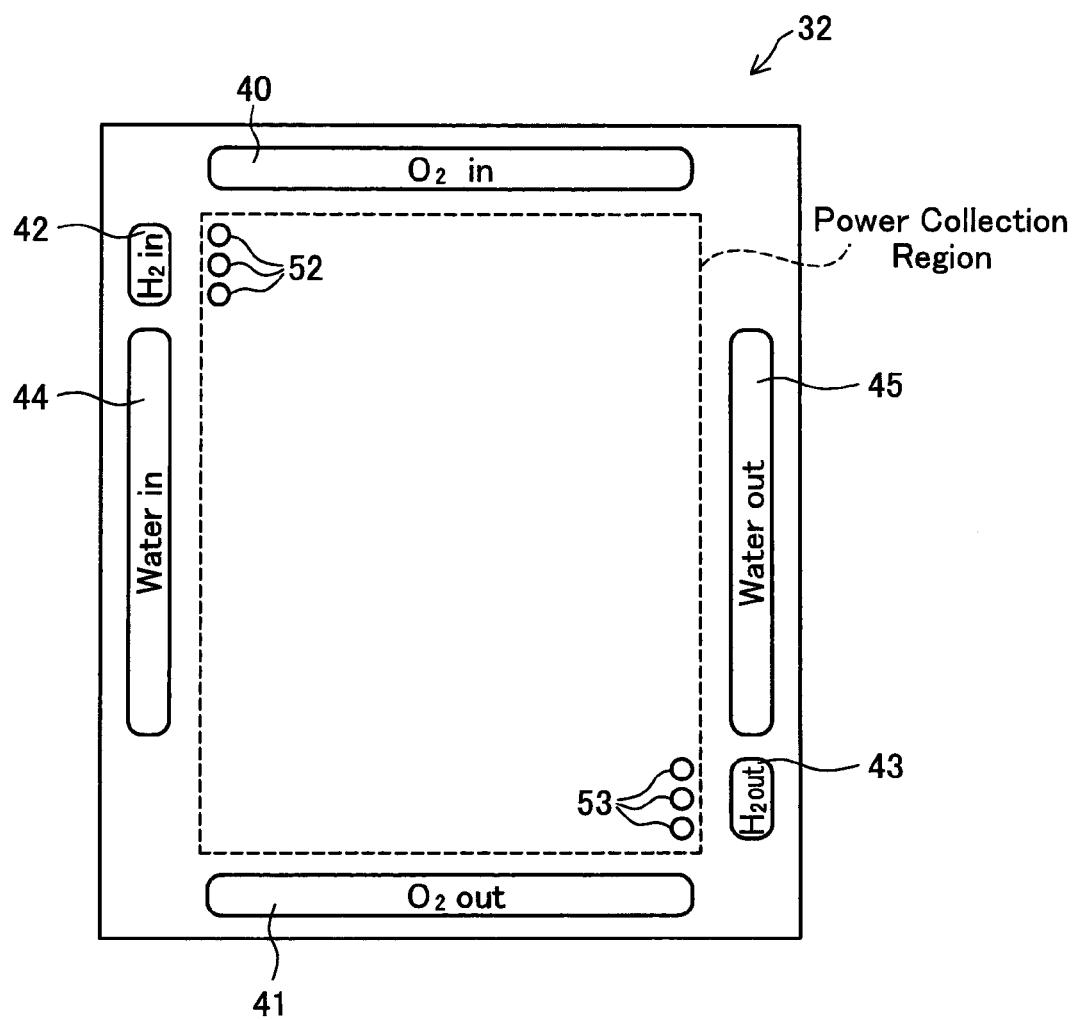
FIG. 3 is a plan view showing the structure of an anode-side plate of the fuel cell stack.
Figure 4:
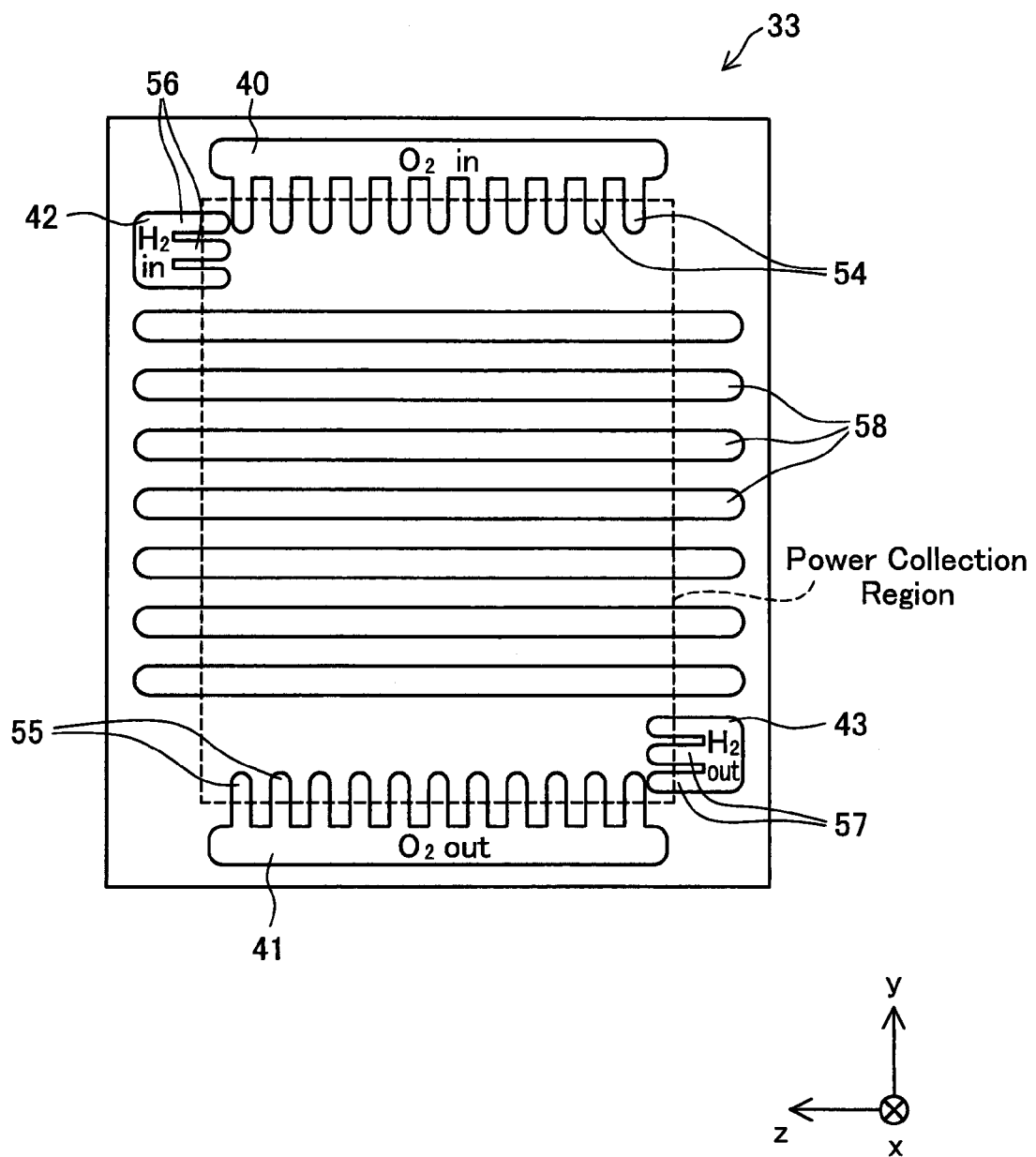
FIG. 4 is a plan view showing the structure of a middle plate of the fuel cell stack.

FIG. 2 is a plan view showing the structure of the cathode-side plate 31. FIG. 3 is a plan view showing the structure of the anode-side plate 32. FIG. 4 is a plan view showing the structure of the middle plate 33. The structures of these three plates are described in detail with reference to FIGS. 2 through 4. These drawings show a power collection region that corresponds to the power generation region on the MEA to collect electricity via the second gas diffusion layer 14 or the second gas diffusion layer 15.

The cathode-side plate 31 (see FIG. 2) and the anode-side plate 32 (see FIG. 3) respectively have six holes formed at corresponding positions. The corresponding holes in lamination of the respective thin sheet plates 31, 33, and 32 are aligned to form a manifold for making the flow of each fluid in parallel to the laminating direction of the fuel cell stack 100. As shown in FIGS. 2 and 3, a long hole 40 is formed along one side of the substantially rectangular periphery in each of the cathode-side plate 31 and the anode-side plate 32. A long hole 41 is formed along an opposite side of the substantially rectangular periphery facing the side of the long hole 40. Holes 42 and 44 are formed along one of the remaining two sides of the substantially rectangular periphery in each of the cathode-side plate 31 and the anode-side plate 32. Holes 43 and 45 are formed along the other side of the substantially rectangular periphery facing the side of the holes 42 and 44. The middle plate 33 (see FIG. 4) has four holes other than the holes 44 and 45 at the respective corresponding positions. The middle plate 33 has multiple cooling medium holes 58 formed to overlap the positions of the holes 44 and 45.

The long holes 40 formed in the respective plates 31, 33, and 32 (see FIGS. 2 through 4) define an oxidizing gas supply manifold to distribute the flow of the oxidizing gas supplied to the fuel cell stack 100 into the respective unit cells 10. The oxidizing gas supply manifold is expressed as 'O2 In' in the drawings. The long holes 41 formed in the respective plates 31, 33, and 32 define an oxidizing gas exhaust manifold to lead the joint flow of the exhaust oxidizing gas discharged from the respective unit cells 10 to the outside. The oxidizing gas exhaust manifold is expressed as 'O2 Out' in the drawings. The holes 42 formed in the respective plates 31, 33, and 32 define a fuel gas supply manifold to distribute the flow of the fuel gas supplied to the fuel cell stack 100 into the respective unit cells 10. The fuel gas supply manifold is expressed as 'H2 In' in the drawings. The holes 43 formed in the respective plates 31, 33, and 32 define a fuel gas exhaust manifold to lead the joint flow of the exhaust fuel gas discharged from the respective unit cells 10 to the outside. The fuel gas exhaust manifold is expressed as 'H2 Out' in the drawings. The holes 44 formed in the cathode-side plate 31 and the anode-side plate 32 define a cooling medium supply manifold to distribute the flow of a cooling medium, for example, cooling water, supplied to the fuel cell stack 100 into the respective separators 30. The cooling medium supply manifold is expressed as 'Water In' in the drawings. The holes 45 formed in the cathode-side plate 31 and the anode-side plate 32 define a cooling medium exhaust manifold to lead the joint flow of the exhaust cooling water discharged from the respective separators 30 to the outside. The cooling medium exhaust manifold is expressed as 'Water Out' in the drawings.

As shown in FIG. 2, the cathode-side plate 31 has multiple connection apertures 50 that are smaller in size than the long hole 40 and are located in the vicinity of the long hole 40 to be aligned in parallel to the long hole 40. The cathode-side plate 31 also has multiple connection apertures 51 that are smaller in size than the long hole 41 and are located in the vicinity of the long hole 41 to be aligned in parallel to the long hole 41. As shown in FIG. 3, the anode-side plate 32 has multiple connection apertures 52 that are smaller in size than the hole 42 and are located in the vicinity of the hole 42 to be aligned in parallel to the hole 42. The anode-side plate 32 also has multiple connection apertures 53 that are smaller in size than the hole 43 and are located in the vicinity of the hole 43 to be aligned in parallel to the hole 43. As shown in FIG. 4, the middle plate 33 has the hole 40 of a different shape from those of the holes 40 formed in the other plates 31 and 32. In the middle plate 33, the inner side of the hole 40 is protruded in the direction of the power collection region to form multiple projecting apertures or connection apertures 54. The connection apertures 54 are arranged to respectively overlap the connection apertures 50 in lamination of the middle plate 33 and the cathode-side plate 31 and connect the oxidizing gas supply manifold to the connection apertures 50. The middle plate 33 similarly has multiple connection apertures 55, 56, and 57 protruded from the holes 41, 42, and 43 to overlap the connection apertures 51, 52, and 53, respectively.

As shown in FIG. 1, the oxidizing gas running through the oxidizing gas supply manifold, which is defined by the holes 40 of the respective plates 31, 33, and 32 in the fuel cell stack 100, is flowed into the unit cell oxidizing gas flow path formed in the second gas diffusion layer 14 via the connection apertures 54 of the middle plate 33 and the connection apertures 50 of the cathode-side plate 31. The oxidizing gas in the unit cell oxidizing gas flow path flows in the direction parallel to the gas diffusion layer 14 (in the surface direction) and further diffuses in the direction perpendicular to the surface direction (laminating direction). The oxidizing gas diffused in the laminating direction goes from the second gas diffusion layer 14 through the first gas diffusion layer 26 to the cathode 22 to be used for the electrochemical reaction. After the electrochemical reaction, the oxidizing gas passing through the unit cell oxidizing gas flow path goes from the second gas diffusion layer 14 through the connection apertures 51 of the cathode-side plate 31 and the connection apertures 55 of the middle plate 33 to be discharged into the oxidizing gas exhaust manifold defined by the holes 41 of the respective plates 31, 33, and 32. The fuel gas running through the fuel gas supply manifold, which is defined by the holes 42 of the respective plates 31, 33, and 32 in the fuel cell stack 100, is flowed into the unit cell fuel gas flow path formed in the second gas diffusion layer 15 via the connection apertures 56 of the middle plate 33 and the connection apertures 52 of the anode-side plate 32. The fuel gas in the unit cell fuel gas flow path flows in the surface direction and further diffuses in the laminating direction. The fuel gas diffused in the laminating direction goes from the second gas diffusion layer 15 through the first gas diffusion layer 28 to the anode 24 to be used for the electrochemical reaction. After the electrochemical reaction, the fuel gas passing through the unit cell fuel gas flow path goes from the second gas diffusion layer 15 through the connection apertures 53 of the anode-side plate 32 and the connection apertures 57 of the middle plate 33 to be discharged to the fuel gas exhaust manifold defined by the holes 43 of the respective plates 31, 33, and 32.

The middle plate 33 has multiple long cooling medium holes 58 arranged in parallel to one another. The respective ends of the cooling medium holes 58 overlap the holes 44 and 45 in lamination of the middle plate 33 with the other thin sheet plates 31 and 32 to form inter-cell cooling medium flow paths for the flow of the cooling medium in the separator 30. The cooling medium flowing through the cooling medium supply manifold defined by the holes 44 in the fuel cell stack 100 is distributed into the inter-cell cooling medium flow paths defined by the cooling medium holes 58. The joint flow of the exhaust cooling medium from the inter-cell cooling medium is discharged to the cooling medium exhaust manifold defined by the holes 45 in the fuel cell stack 100.

A2. Structure of Gasket

The fuel cell stack 100 of FIG. 1 also has a gasket 16 that is located between each pair of adjacent separators 30 and is arranged on the periphery of the MEA. The gasket 16 is the characteristic part of the present invention.

Figure 5:
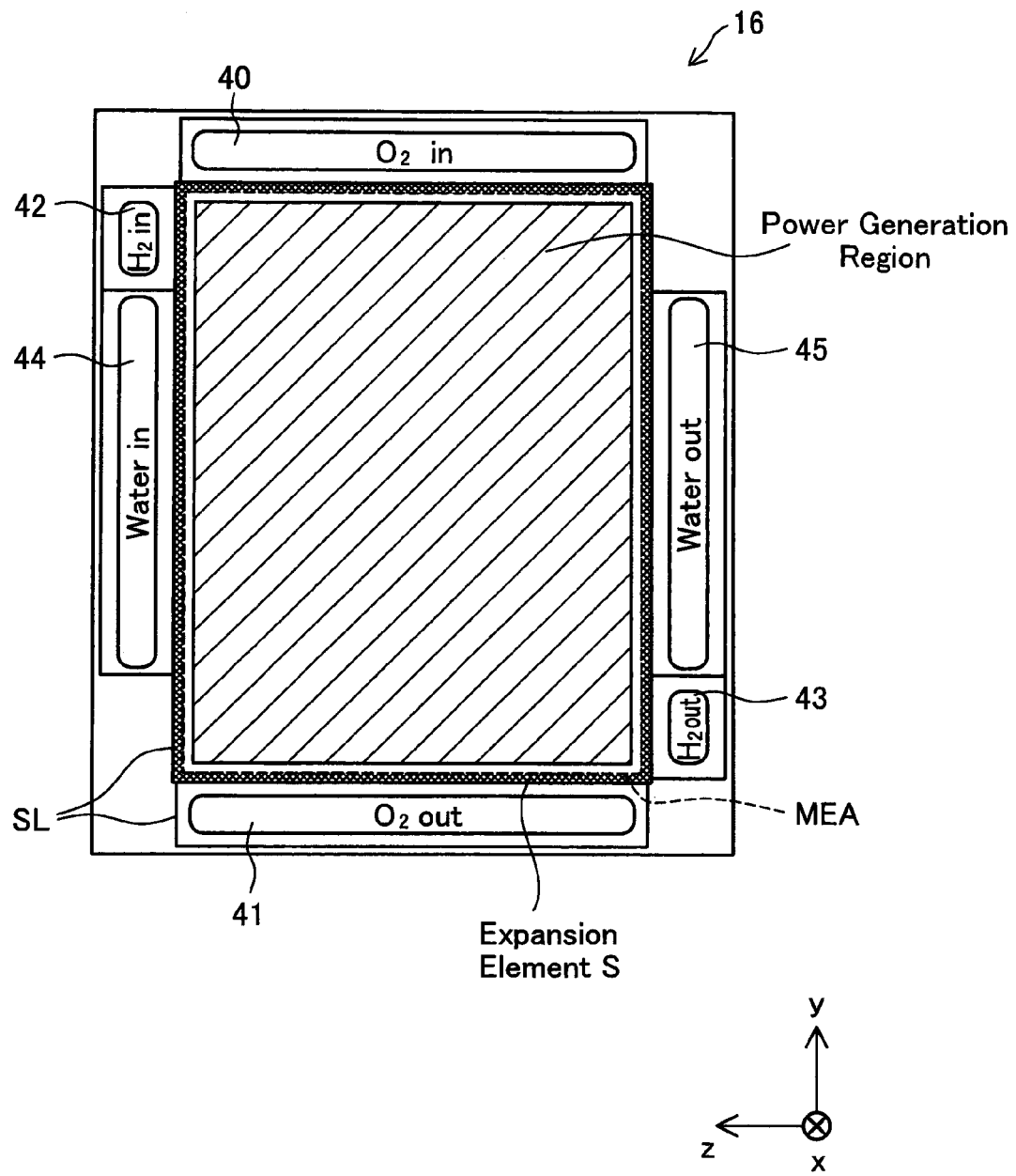
FIG. 5 is a plan view schematically illustrating the structure of a gasket integrated with the MEA of the fuel cell stack.
Figure 6:
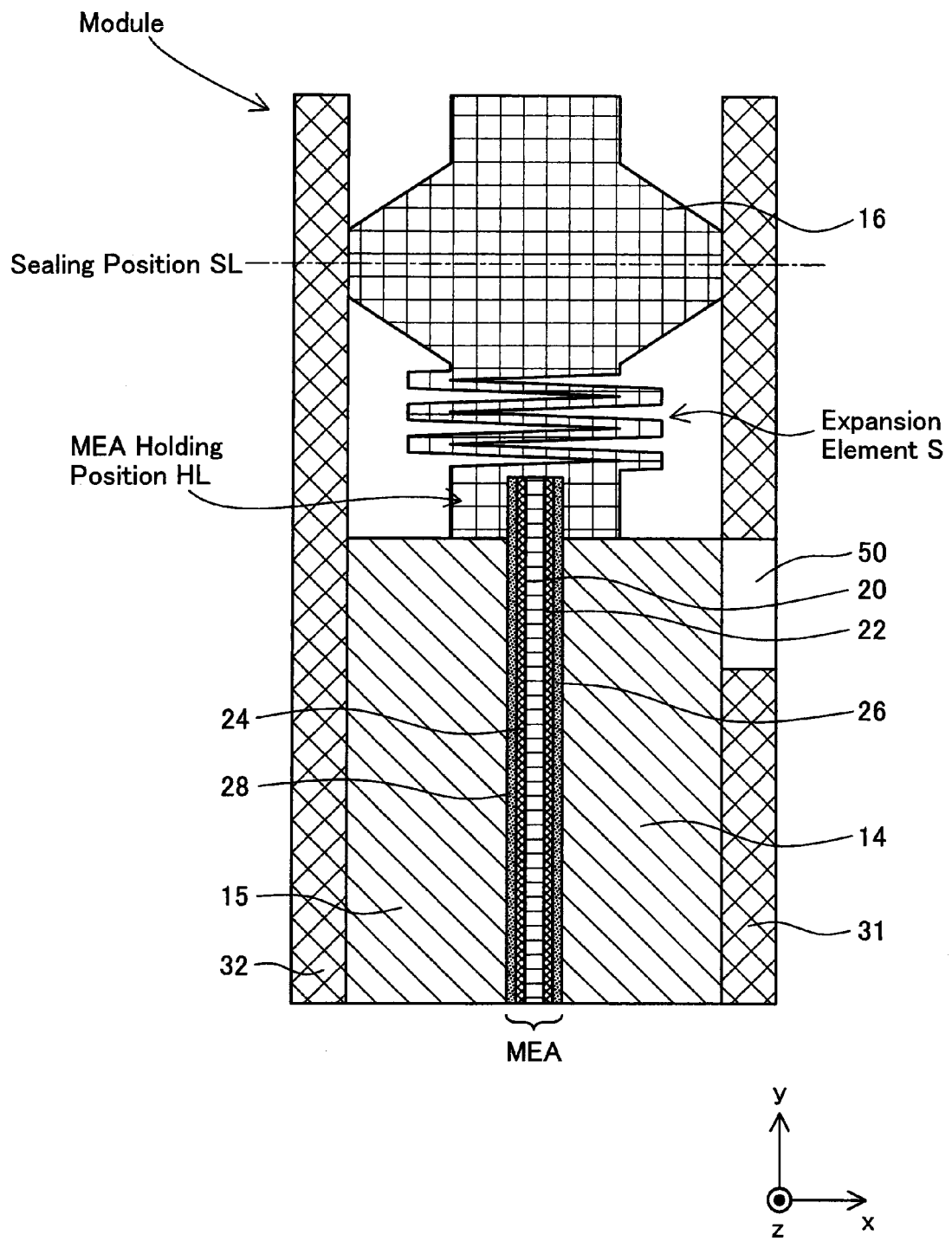
FIG. 6 is an enlarged view showing the joint structure of the gasket and the MEA, that is, an area R encircled by the broken line in FIG. 1.

FIG. 5 is a plan view schematically illustrating the structure of the gasket 16 integrated with the MEA of the fuel cell stack 100 shown in FIG. 1. The gasket 16 is shown in the direction 'x' in FIG. 5. The broken line in FIG. 5 represents the periphery of the MEA embedded in the gasket 16. FIG. 6 is an enlarged view showing the joint structure of the gasket 16 and the MEA, that is, an area R encircled by the broken line in FIG. 1.

The gasket 16 is made of a dielectric resin material having elasticity, such as silicone rubber, butyl rubber, or fluororubber, and is integrated with the MEA (see FIG. 6). A typical manufacturing process places the MEA in a cavity of a mold and injection molds the dielectric resin material to form the gasket 16. The porous first gas diffusion layers 26 and 28 are thus impregnated with the dielectric resin material. The impregnation tightly integrates the gasket 16 with the MEA and ensures the sufficient gas sealing property between the opposed faces of the MEA. The gasket 16 has an elastic modulus Gk in the direction along the faces of the electrolyte membrane 20 (membrane surface direction: direction 'y').

The second gas diffusion layers 14 and 15 have an identical shape with the shape of a power generation region filled with hatched lines in FIG. 5. The second gas diffusion layers 14 and 15 are thus embedded in the power generation region of the gasket 16. Namely the second gas diffusion layers 14 and 15 embedded in the power generation region are smaller in size than the MEA. The second gas diffusion layers 14 and 15 are smaller in size than the first gas diffusion layers 26 and 28 and are arranged to have their peripheries laid on the faces of the catalyst electrodes 22 and 24 and the first gas diffusion layers 26 and 28.

As shown in FIG. 5, the gasket 16 is a substantially rectangular thin plate member and has six holes on the periphery and a substantially rectangular center opening. The six holes correspond to the holes formed in the cathode-side plate 31 (see FIG. 2) or the holes formed in the anode-side plate 32 (see FIG. 3). The MEA is embedded in the substantially rectangular center opening of the gasket 16. The gasket 16 is not flat but has a predetermined concavo-convex shape as shown in FIG. 6. In the fuel cell stack 100, the gasket 16 has a convex section that surrounds the six holes and the center opening and is in contact with the adjacent separator 30. The contact position of the gasket 16 with the separator 30 is called a sealing position SL (see FIGS. 1, 5, and 6). The gasket 16 is made of the elastic resin material as mentioned above. Application of a pressing force in the laminating direction thus fixes the gasket 16 at the sealing position SL in the fuel cell stack 100. This arrangement effectively prevents reverse flows of the reactive gases (oxidizing gas and fuel gas) supplied to the second gas diffusion layers 14 and 15 into the respective supply manifolds.

The gasket 16 of the embodiment has a serpentine or wavy structure extended in the membrane surface direction to be arranged between the sealing position SL for fixing the MEA and an MEA holding position HL for holding the MEA as shown in FIG. 6. The serpentine structure is expandable in the membrane surface direction and forms an expansion element S. An elastic modulus Gs of the expansion element S in the membrane surface direction is higher than the elastic modulus Gk of the gasket 16 other than the expansion element S. A cross hatched area in FIG. 5 represents the expansion element S.

As described above, in the fuel cell stack 100 of the first embodiment, the gasket 16 has the expansion element S between the sealing position SL for fixing the MEA and the MEA holding position HL for holding the MEA. The elastic modulus Gs of the expansion element S is higher than the elastic modulus Gk of the remaining part of the gasket 16. The electrolyte membrane 20 may be expanded or contracted in the membrane surface direction in the fuel cell stack 100 through repeated cycles of power generation with intermittent rest time periods. The expansion element S of the gasket 16 is expanded or contracted with the expansion or contraction of the electrolyte membrane 20 and thus relieves the stress applied to the electrolyte membrane 20. This structure of the first embodiment effectively prevents deterioration of the electrolyte membrane 20 due to the expansion or contraction of the electrolyte membrane 20 in the membrane surface direction.

The gasket 16 has the integrated structure with the expansion element S to exert the various functions. These functions include the gas sealing property between the opposed faces of the MEA, the function of preventing the reverse flows of the reactive gases supplied to the second gas diffusion layers 14 and 15 into the respective supply manifolds, the function of fixing the MEA, and the function of holding the MEA. This integrated structure desirably decreases the total number of parts, compared with the conventional structure of exerting these functions by separate elements.

The gasket 16 of the first embodiment corresponds to the holder element and the fixation element of the invention, and the expansion element S of the first embodiment corresponds to the expansion element of the invention.

B. Second Embodiment

Figure 7:
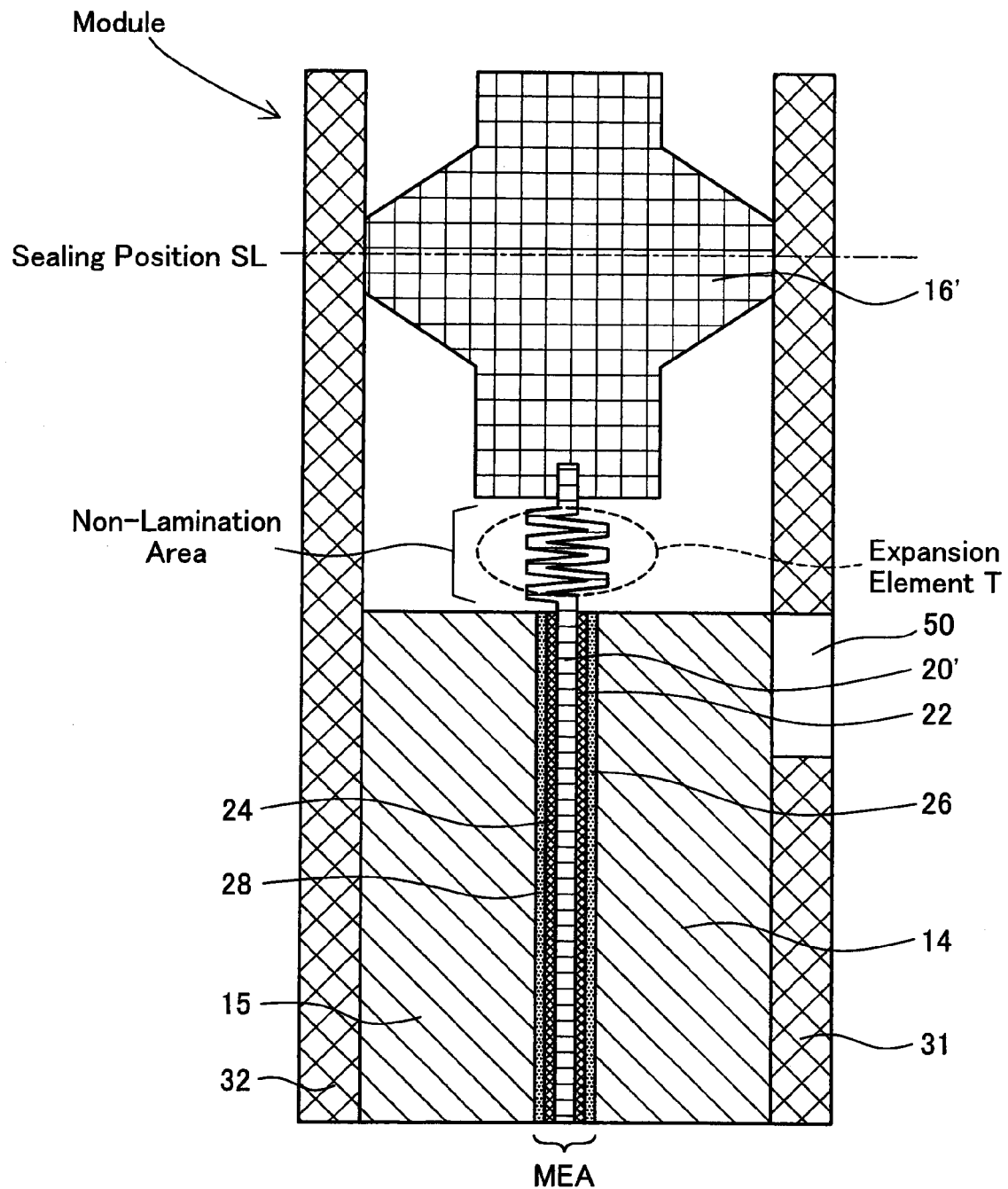
FIG. 7 is a view showing the joint structure including an expansion element T in a fuel cell module of a second embodiment of the invention.

FIG. 7 is a view showing the joint structure including an expansion element T in a fuel cell module of a second embodiment of the invention. A fuel cell stack of the second embodiment has the similar construction to that of the fuel cell stack 100 of the first embodiment, except the joint structure of a gasket with an electrolyte membrane. The like elements are expressed by the like numerals and symbols and are not specifically described here. The enlarged view of FIG. 7 shows only the joint structure of a gasket 16' with an electrolyte membrane 20' in the fuel cell module of the second embodiment, like the enlarged view of FIG. 6.

The gasket 16' of the second embodiment basically has the similar structure to that of the gasket 16 of the first embodiment with omission of the expansion element S, as shown in FIG. 7. The electrolyte membrane 20' of the second embodiment has a non-lamination area on its periphery. There is no lamination of the catalyst electrodes (cathode 22 and anode 24) in the peripheral non-lamination area. The non-lamination area of the electrolyte membrane 20' has a serpentine or wavy structure extended in the membrane surface direction. The serpentine structure is expandable in the membrane surface direction and forms an expansion element T. The gasket 16' of the second embodiment holds one end of the non-lamination area of the electrolyte membrane 20'. This arrangement ensures the sufficient gas sealing property between the opposed faces of the MEA. Like the gasket 16 of the first embodiment, the gasket 16' of the second embodiment is fixed at the sealing position SL. An elastic modulus Ms of the expansion element T in the membrane surface direction is higher than the elastic modulus Gk of the gasket 16. There is no lamination of the catalyst electrodes in the non-lamination area. The non-lamination area is accordingly a non-power generation region with no power generation.

As described above, in the fuel cell stack of the second embodiment, the electrolyte membrane 20' has the expansion element T in the non-lamination area with no lamination of the catalyst electrodes. The elastic modulus Ms of the expansion element T is higher than the elastic modulus Gk of the gasket 16. The electrolyte membrane 20' may be expanded or contracted in the membrane surface direction in the fuel cell stack through repeated cycles of power generation with intermittent rest time periods. The expansion element T formed in the non-lamination area of the electrolyte membrane 20' is expanded or contracted with the expansion or contraction of the electrolyte membrane 20' and thus relieves the stress applied to the electrolyte membrane 20'. This structure of the second embodiment effectively prevents deterioration of the electrolyte membrane 20' due to the expansion or contraction of the electrolyte membrane 20' in the membrane surface direction.

The gasket 16' of the second embodiment corresponds to the holder element and the fixation element of the invention, and the expansion element T of the second embodiment corresponds to the expansion element of the invention.

C. Modifications

The embodiments discussed above are to be considered in all aspects as illustrative and not restrictive. There may be many modifications, changes, and alterations without departing from the scope or spirit of the main characteristics of the present invention.

C1. Modified Example 1

In the fuel cell stack 100 of the first embodiment, each gasket 16 is essentially required to have the function of holding the MEA and the function of being fixed to the separator 30, in addition to the expansion element S. The gasket having these essential functions may be applied to fuel cell stacks of various configurations. For example, the gasket 16 may be favorably adopted in a fuel cell stack where a preset packing member or sealing member is interposed between the gasket 16 and the separator 30. The gasket 16 has the similar effects in this application to those described above. In this structure, the gasket 16 is fixed to the separator 30 via the packing member.

C2. Modified Example 2

In the fuel cell stack of the second embodiment, the electrolyte membrane 20' of the MEA is held and fixed by the gasket 16'. This structure is, however, not essential for the technique of the invention. The MEA of the second embodiment may be applied to a fuel cell module Mj shown in FIG. 8.

Figure 8:
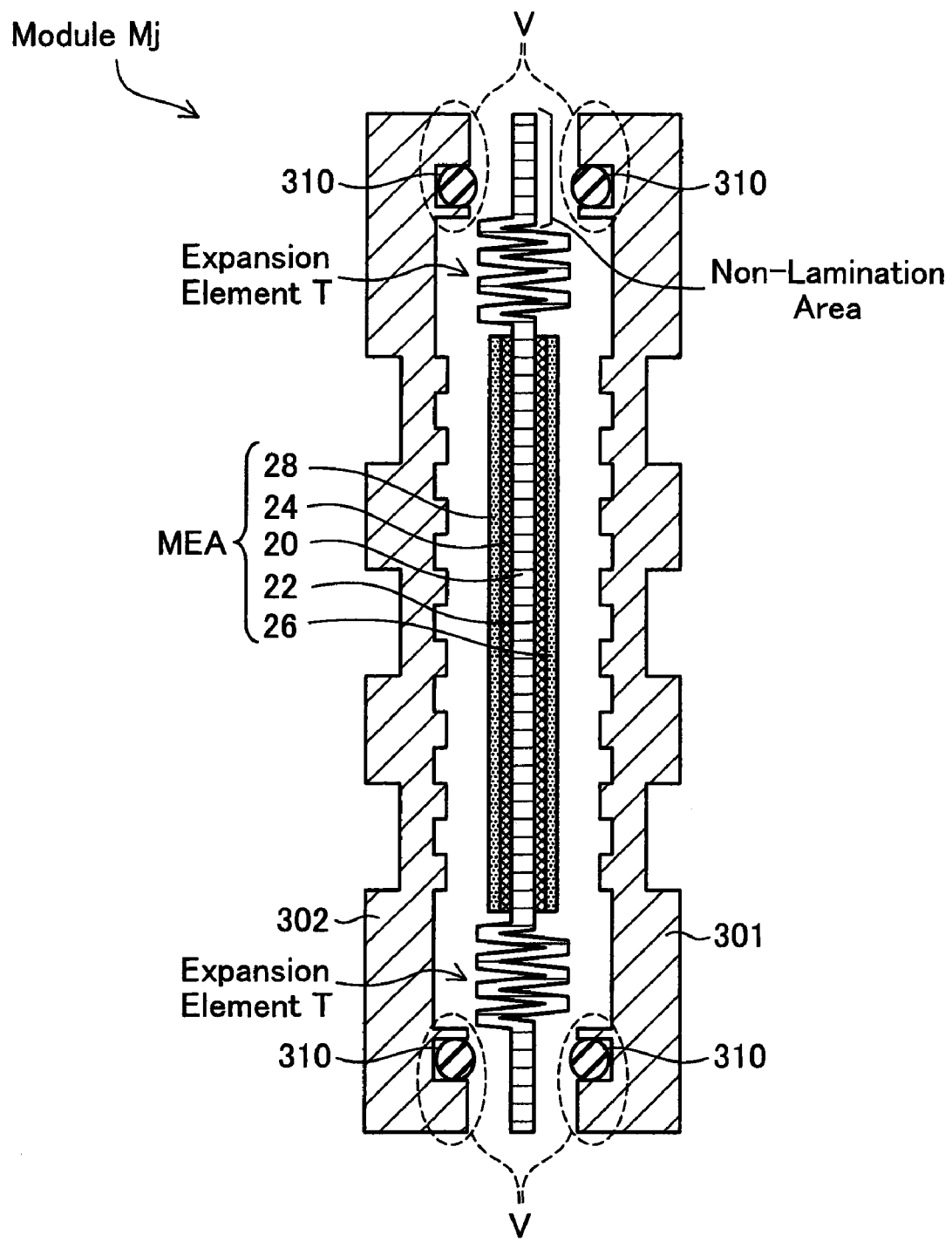
FIG. 8 is a sectional view schematically illustrating the structure of a fuel cell module Mj in Modified Example 2.

FIG. 8 is a sectional view schematically illustrating the structure of the fuel cell module Mj in Modified Example 2. The fuel cell module Mj has support fixation elements V provided at both ends of a cathode-side plate 301 and an anode-side plate 302. The end of the non-lamination area of the electrolyte membrane 20' is interposed between the support fixation element V of the cathode-side plate 301 and the support fixation element V of the anode-side plate 302. This structure effectively supports and fixes the electrolyte membrane 20'. For the better understanding, the illustration of FIG. 8 has spaces between the MEA and the cathode-side plate 301 and between the MEA and the anode-side plate 302. Each of the support fixation elements V of the cathode-side plate 301 and the anode-side plate 302 has a sealing member 310 as shown in FIG. 8. The sealing members 310 are pressed against the electrolyte membrane 20' when the end of the non-lamination area of the electrolyte membrane 20' is interposed between the support fixation element V of the cathode-side plate 301 and the support fixation element V of the anode-side plate 302. This structure desirably ensures the sufficient sealing property between the opposed faces of the MEA.

As described above, in Modified Example 2, the MEA of the second embodiment is applied to the fuel cell module Mj. The electrolyte membrane 20' may be expanded or contracted in the membrane surface direction in the fuel cell module Mj through repeated cycles of power generation with intermittent rest time periods. The expansion element T formed in the non-lamination area of the electrolyte membrane 20' is expanded or contracted with the expansion or contraction of the electrolyte membrane 20' and thus relieves the stress applied to the electrolyte membrane 20'. This structure of Modified Example 2 effectively prevents deterioration of the electrolyte membrane 20' due to the expansion or contraction of the electrolyte membrane 20' in the membrane surface direction. The support fixation element V of Modified Example 2 corresponds to the holder element and the fixation element of the invention.

C3. Modified Example 3

In the fuel cell stack 100 of the first embodiment, the expansion element S of the gasket 16 is formed along the whole periphery of the gasket 16 (see the cross hatched area in FIG. 5). The principle of the invention is, however, not restricted to this structure. The expansion element S may be formed along at least part of the periphery of the gasket 16.

C4. Modified Example 4

In the fuel cell stack of the second embodiment, the non-lamination area is formed along the whole periphery of the electrolyte membrane 20'. The principle of the invention is, however, not restricted to this structure. The non-lamination area may be formed along at least part of the periphery of the electrolyte membrane 20'. In this modified structure, the expansion element T may be formed in at least part of the non-lamination area of the electrolyte membrane 20'. When the non-lamination area is formed along the whole periphery of the electrolyte membrane 20', the expansion element T may be formed in only part of the non-lamination area of the electrolyte membrane 20'.

The invention claimed is:

1. A polymer electrolyte fuel cell, comprising:
   an electrolyte membrane that is made of a solid polymer;
   catalyst electrode layers that are arranged and formed on two opposed faces of the electrolyte membrane;
   gas separators that form reactive gas supply flow paths to allow passage of reactive gases subjected to an electrochemical reaction to the catalyst electrode layers, wherein the gas separators each comprise a cathode side plate, an anode side plate, and a middle plate, wherein the middle plate is disposed between the cathode side plate and the anode side plate;
   a holder element that is located on periphery of the electrolyte membrane and the catalyst electrode layers to support at least the electrolyte membrane;
   an expansion element having at least partly a serpentine or wavy structure that is linked with the holder element to be expandable in an electrolyte membrane surface direction; and
   a fixation element that is linked with the expansion element and fixed to one of the cathode side plates and one of the anode side plates of the gas separators.

2. A polymer electrolyte fuel cell, comprising:
   an electrolyte membrane that is made of a solid polymer;
   catalyst electrode layers that are arranged and formed on two opposed faces of the electrolyte membrane;
   gas separators that form reactive gas supply flow paths to allow passage of reactive gases subjected to an electrochemical reaction to the catalyst electrode layers, wherein the gas separators each comprise a cathode side plate, an anode side plate, and a middle plate, wherein the middle plate is disposed between the cathode side plate and the anode side plate;
   a holder element that is located on periphery of the electrolyte membrane to support at least the electrolyte membrane; and
   a fixation element that fixes the holder element, the fixation element being fixed to one of the cathode side plates and one of the anode side plates of the gas separators;
   wherein the electrolyte membrane has a non-lamination area with no lamination of the catalyst electrode layers on the periphery of the electrolyte membrane,
   the electrolyte membrane having an expansion element having at least partly a serpentine or wavy structure that is provided in at least part of the non-lamination area and is expandable in an electrolyte membrane surface direction.

3. A polymer electrolyte fuel cell in accordance with claim 1, wherein the gas separators have flat faces without undulation.

4. A polymer electrolyte fuel cell in accordance with claim 1 or 3, wherein the expansion element has a higher elastic modulus in the electrolyte membrane surface direction than an elastic modulus of the holder element or an elastic modulus of the fixation element.

5. A polymer electrolyte fuel cell in accordance with claim 1, wherein either of the holder element and the fixation element forms at least part of a gasket, which is activated to ensure gas sealing property between the two opposed faces of the electrolyte membrane.

6. A polymer electrolyte fuel cell in accordance with claim 1, the polymer electrolyte fuel cell further comprising gas diffusion layers that are placed outside the respective catalyst electrode layers and are made of an electrically-conductive porous material.

7. A polymer electrolyte fuel cell in accordance with claim 1, wherein the expansion element has a serpentine structure.

8. A gasket that is applied to a polymer electrolyte fuel cell, the polymer electrolyte fuel cell comprising: an electrolyte membrane that is made of a solid polymer; catalyst electrode layers that are arranged and formed on two opposed faces of the electrolyte membrane; and gas separators, wherein the gas separators each comprise a cathode side plate, an anode side plate, and a middle plate, wherein the middle plate is disposed between the cathode side plate and the anode side plate, the gasket being activated to ensure gas sealing property between the two opposed faces of the electrolyte membrane,
   the gasket comprising:
   a holder element that is located on periphery of the electrolyte membrane and the catalyst electrode layers to support at least the electrolyte membrane;
   an expansion element having at least partly a serpentine or wavy structure that is linked with the holder element to be expandable in an electrolyte membrane surface direction; and
   a fixation element that is linked with the expansion element and fixed to one of the cathode side plates and one of the anode side plates of the gas separators.

9. A polymer electrolyte fuel cell in accordance with claim 1, wherein the fuel cell further comprises a gasket comprising the holder element, the expansion element, and the fixation element, wherein the gasket is disposed between adjacent gas separators of the polymer electrolyte fuel cell.

10. A polymer electrolyte fuel cell in accordance with claim 2, wherein the fuel cell further comprises a gasket comprising the holder element, the expansion element, and the fixation element, wherein the gasket is disposed between adjacent gas separators of the polymer electrolyte fuel cell.

11. A gasket in accordance with claim 8, wherein the gasket is disposed between adjacent gas separators of the polymer electrolyte fuel cell.

12. A polymer electrolyte fuel cell in accordance with claim 1, wherein the expansion element is disposed between the holder element and the fixation element.

13. A polymer electrolyte fuel cell in accordance with claim 2, wherein the expansion element is disposed between the holder element and the fixation element.

14. A gasket in accordance with claim 8, wherein the expansion element is disposed between the holder element and the fixation element.

* * * * *